Feb. 17, 1948.　　　M. B. MORGAN　　　2,435,977
ACTUATOR ASSEMBLY FOR BRAKE MECHANISM
Filed Sept. 30, 1943　　　3 Sheets-Sheet 1
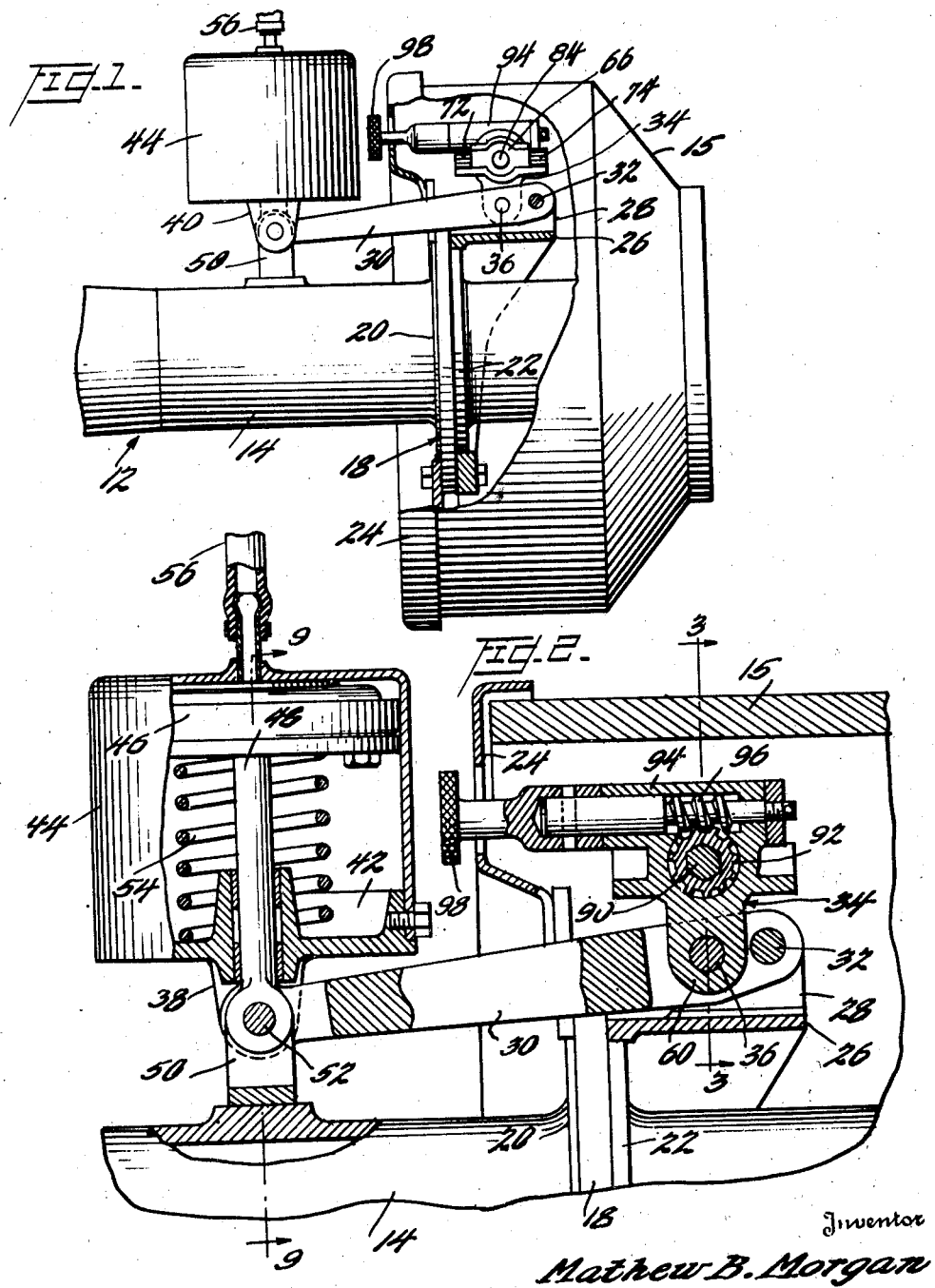
Inventor
Mathew B. Morgan
By Strauch & Hoffman
Attorneys

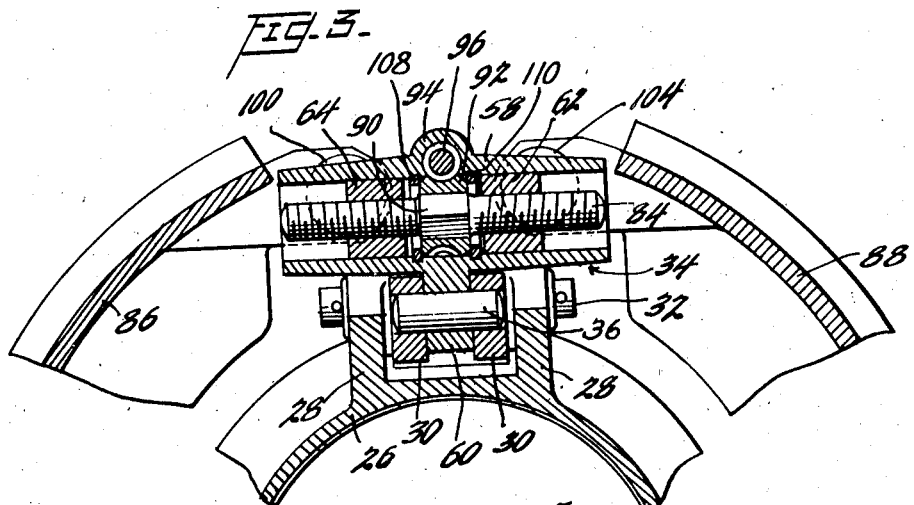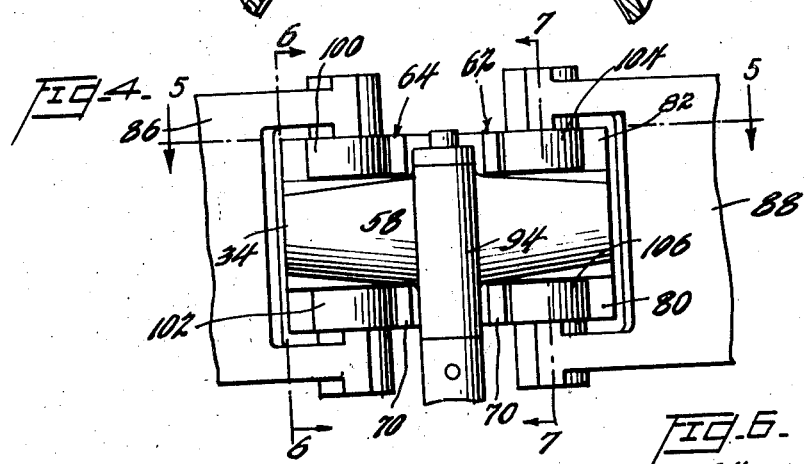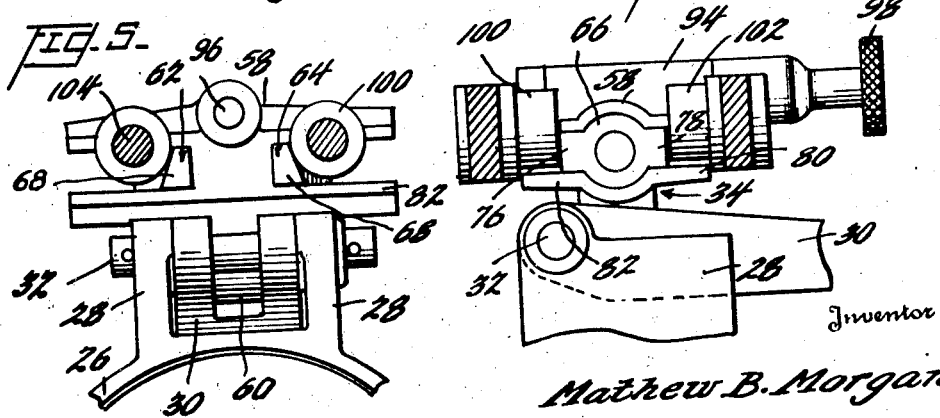

Feb. 17, 1948. M. B. MORGAN 2,435,977
ACTUATOR ASSEMBLY FOR BRAKE MECHANISM
Filed Sept. 30, 1943 3 Sheets-Sheet 3
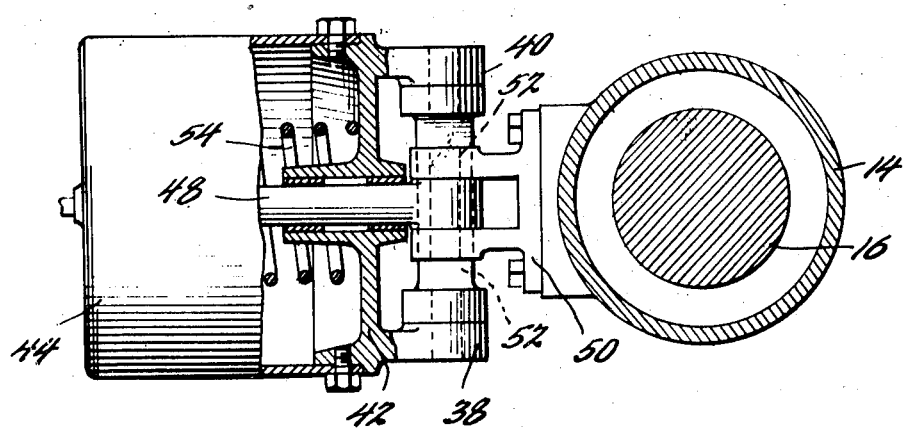
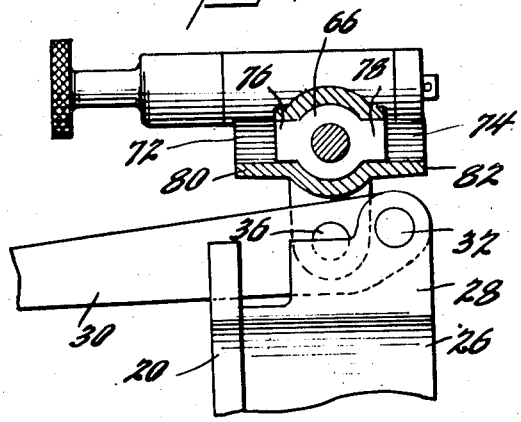
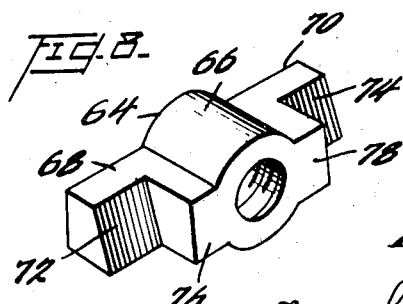
Inventor
Mathew B. Morgan
By Strauch & Hoffman
Attorneys

Patented Feb. 17, 1948

2,435,977

UNITED STATES PATENT OFFICE 2,435,977

ACTUATOR ASSEMBLY FOR BRAKE MECHANISM

Mathew B. Morgan, Detroit, Mich., assignor to The Timken-Detroit Axle Company, Detroit, Mich., a corporation of Ohio Application September 30, 1943, Serial No. 504,479

13 Claims. (Cl. 188—78)

This invention relates to improvements in brake mechanisms and has particular reference to the type of brake in which a pair or plurality of brake shoes are forced into pressure contact with a cylindrical brake drum by a movable element acting on adjacent brake shoe ends.

It is known to use a rotatable cam pivoted on the backing plate or brake shoe mounting plate to force adjacent ends of the brake shoes apart to apply pressure to the contacting surfaces of the brake shoes and the brake drum and it has been proposed to substitute a floating or laterally movable wedge member movable between abutments on adjacent brake shoe ends for such a rotatable cam actuator.

It has also been heretofore proposed to provide brake adjusting means operative to move the brake shoes relative to the brake drum to compensate for wear of the brake lining material. Such prior brake adjusting means have usually been disposed between adjacent brake shoe ends remote from the cam ends, and have acted to displace the otherwise relatively fixed pivot upon which the remote ends of the brake shoes are mounted. Such prior brake actuating and adjusting means have various disadvantages which it is among the objects of the present invention to overcome.

Among the principal disadvantages of such prior art devices are the consideration that when the cam is mounted to rotate about a relatively fixed axis, or any other type of expander is restricted to a definite path, either radial or tangential or a combination of radial or tangential directions, the associated brake shoe ends are not permitted to move in the same direction circumferentially of the brake drum and there is thus no adequate compensation for unequal wear of the brake lining on the different shoes nor for uneven distortion of the drum or shoes due to temperature changes. Likewise, when the brake adjusting device is associated with the brake shoe anchor pivots, the pivots are often moved substantially equal distances in opposite directions upon adjustment of the brake, so that there is no adequate compensation for unequal wear or uneven distortion at the adjustment ends of the brake shoes.

The present invention thus has for its major object the provision of a brake having floating or laterally movable brake expanding and brake adjusting means, so that the brake shoes may move together relative to the brake drum within small limits to compensate for unequal wear or uneven distortion of the brake mechanism, irrespective of the adjustment of the brake.

A further object resides in the provision of a vehicle brake in which the brake expanding mechanism and the brake adjusting mechanism are combined into a single unit, thereby accomplishing an economy of parts with consequent reduction in manufacturing costs and freedom from trouble in operation.

A more specific object resides in the provision of a vehicle brake in which the brake adjusting means is combined with a free floating, wedge type brake shoe expander.

A further object resides in the provision of a compact power operated vehicle brake having an expansible chamber power unit so mounted on the vehicle axle and connected to the brake expander in such a manner that the power unit does not normally extend outwardly from the axle a distance materially greater than that necessary to give the required working range of movement thereto.

Further objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only as it will be apparent to those skilled in the art that various changes in the illustrated arrangement may be resorted to without in any way exceeding the scope of the invention.

In the drawings:

Figure 1 is a view of the end portion of a vehicle axle and the associated brake showing the application thereto of brake mechanisms constructed according to the invention;

Figure 2 is a sectional view on an enlarged scale of the brake mechanism indicated in Figure 1;

Figure 3 is a sectional view of a fragmentary portion of the brake mechanism taken on the line 3—3 of Figure 2 and looking in the direction of the arrows;

Figure 4 is a top plan view of the brake mechanism illustrated in Figure 3;

Figure 5 is a sectional view of the brake mechanism shown in Figures 3 and 4 taken on the line 5—5 of Figure 4;

Figure 6 is a sectional view of the brake mechanism particularly illustrating the adjusting means and taken on the line 6—6 of Figure 4;

Figure 7 is a view similar to Figure 6 taken on the line 7—7 of Figure 4.

Figure 8 is a perspective view of a cam element comprising a portion of the improved brake expanding and adjusting means; and Figure 9 is a sectional view of the brake actuating power unit taken on the line 9—9 of Figure 2.

Referring to the drawings by numerals, 12 generally indicates the vehicle axle which, as shown in Figure 9, may comprise an axle housing 14 enclosing an axle shaft 16 drivingly connected with the vehicle wheel, not illustrated, to which the brake drum 15 is rigidly secured. Near its outer end, the axle casing 14 carries a flange 18 formed integrally therewith or rigidly secured thereto. The outer portion of flange 18 may be reduced to provide annular pilot faces 20 and 22. An annular cover plate 24 is secured to the flange 18 surrounding the pilot face 20 and centered thereon and overlaps the inner open end of the brake drum 15.

A bracket 26 centered on the pilot face 22 is rigidly secured to the flange 18 and carries at its lower end stationary anchor pivots (not illustrated), for the corresponding ends of the brake shoes and at its upper end carries a pair of spaced apertured lugs 28. One end of a lever 30 is pivotally secured by a suitable pin 32 to the lugs 28. Intermediate its length the lever 30 is pivotally secured to a carrier member, generally indicated at 34, by means of a depending apertured lug on the carrier member which projects between the sides of the bifurcated lever end and is secured thereto by the fulcrum pin 36. At its opposite end, the lever is also bifurcated and secured by suitable pivotal connections to depending lugs 38 and 40 projecting downwardly or inwardly from an end closure member 42 secured in the open end of cylinder 44 which is slidably mounted on piston assembly 46 secured by stem 48, axle mounted lugs 50 and pivot pin 52 to the axle casing 14. The cylinder is urged inwardly relative to the piston by coiled compression spring 54 and is forced outwardly relative to the piston to apply the brake by compressed air supplied through conduit 56.

With this arrangement, when the brake is released, the cylinder occupies the operative position nearest the axle 12 and the entire device has a minimum projection outwardly from the axle, thus providing an efficient and compact design.

The carrier member 34 is particularly illustrated in Figures 3, 4, and 5, to which reference may now be had for a detailed description. This member has a generally cylindrical portion 58 from which the lug 60 projects radially at substantially the mid-length of the cylindrical portion and pivotally connects the cylindrical portion to the bifurcated end of the lever 30 through the intermediacy of the pin 36. The exterior of the cylindrical portion is preferably tapered in both directions from the center and each half thereof is provided with two diametrically opposite slots having open ends at the corresponding ends of the opposite halves of the cylindrical portion.

Within the cylindrical portion are slidably mounted a pair of oppositely disposed cam members as indicated at 62 and 64, one of them being particularly illustrated in Figure 8. As illustrated, the cam member has a longitudinally apertured, cylindrical portion 66 which fits the cylindrical bore in the carrier member and has a pair of diametrically opposite arms 68 and 70 which project outwardly through the slots in the carrier member. Each cam member has a pair of cam surfaces, as indicated at 72 and 74, disposed beyond the outer wall of the carrier member and the arm portions 76 and 78 which extend through the wall thickness of the carrier member. The carrier member has along the bottom edge of each slot an outwardly projecting table or shelf, particularly illustrated in Figure 7 and indicated at 80 and 82, which underlie the arms of the corresponding cam members and provide additional support therefor.

The cam members are internally threaded and receive the oppositely threaded end portions of an adjusting screw 84 functioning to hold the two cam members a predetermined distance apart while permitting them to move relative to the carrier member in order to provide a free floating contact device between the roller abutments on the ends of the brake shoes 86 and 88.

Intermediate its length the stem of screw 84 is provided with a non-circular portion 90 surrounded by a worm gear 92 which is effective to rotate the adjusting screw 84. The adjusting screw is freely slidable through the worm gear.

On its side opposite the lug 60 the carrier member is provided with an elongated transverse boss 94 which rotatably receives a worm shaft 96 meshed with the worm gear 92. The worm shaft 96 projects beyond the carrier and through the cover plate 24, as particularly illustrated in Figure 2, and is provided at its ends with a knurled or non-circular knob 98.

As particularly illustrated in Figure 4, the brake shoe 86 is provided with rollers 100 and 102 which contact the cam faces of the cam member 64 while the shoe 88 is provided with similar rollers 104 and 106 which contact the cam faces of the cam member 62, the space between the corresponding shelves on the carrier member and the adjacent portions of the rollers being sufficient to permit the cam faces to spread the brake shoes apart by an amount sufficient to apply the brake.

The roller abutments of each brake shoe are disposed one on each side of the carrier member and contact the cam surfaces of the corresponding cam member at either side of the cylindrical portion so that, when the carrier is moved outwardly relative to the bracket 26, the adjacent ends of the brake shoe members are forced apart to expand the brake and, at the same time, may be slightly lifted to bring the upper ends of the shoes into contact with the inner surface of the brake drum to provide a self-energizing effect which tends to facilitate the movement of one or the other of the brake shoes into pressure contact with the brake drum depending upon the direction of rotation of the brake drum.

The brake is adjusted by rotation of the knob 98 which in turn rotates the worm gear 92 and the adjusting screw 84, which screw acts to adjust the distance between the two opposed cam members which, through the contact between the cam surfaces and the roller abutments on the brake shoes, controls the distance between the outer surfaces of the brake shoes and the inner surface of the brake drum. As the unit comprising the two cam members and the adjusting screw 84 is freely slidable in the carrier member in directions generally tangential to the brake drum, the adjacent ends of the two brake shoes may move together to a position in which the brake shoes are properly centered relative to the brake drum, thus compensating for unequal wear of the brake shoes or uneven expansion or contraction of the shoes and the brake drum.

The adjusting screw 84 is freely slidable through the worm gear 92 in order to provide the above described free floating movement of the cam unit. The worm itself, however, is held against movement longitudinally of the carrier member by a pair of abutment rings 108 and 110 and is thus retained in proper mesh with the worm shaft 96.

When it is desired to apply the brake, compressed air is admitted through the conduit 56, under manual control, by a suitable manually actuated valve, not illustrated, into the space between the outer closed end of cylinder 44 and the adjacent surface of piston assembly 46. This moves the cylinder 44 outwardly relative to the axle 12 and swings the lever 30 about the fixed pivot 32, the mounting of the piston rod 48 to the lugs 50 compensating for the arcuate movement of the cylinder connected end of the lever 30. As the lever 30 moves about the pivot 32, it moves the carrier member 34 outwardly relative to the brake mechanism thereby moving the cam surfaces of the opposed cam members in contact with the roller abutments on the brake shoes and expanding the brake shoes into pressure contact with the inner surface of the brake drum 18. Upon release of the compressed air, the spring 54 retracts the cylinder relative to the piston assembly and moves the lever to return the carrier member and the cam members inwardly while at the same time suitable shoe retracting springs, not illustrated but well known to the prior art, move the brake shoes inwardly out of contact with the brake drum.

Because of the free floating arrangement of the brake adjusting mechanism, proper adjustment of the brake is rendered extremely easy since it is only necessary to rotate the knob 98 in a direction to expand the brake shoe mechanism until the brake shoes are brought firmly into contact with the brake drum, as indicated by the rapid increase in resistance to turning of the knob. The knob may then be turned in the opposite direction or "backed off" a predetermined angular amount which can be accurately calibrated in terms of movement of the brake shoes, whereby the shoes can be set to give the desired release clearance without the necessity of the usual multiple adjustment and feeler gauge measurements of the space between the brake lining and the brake drum.

While I have shown the novel brake actuating mechanism of the invention as coacting directly with the free ends of pivoted brake shoes, it is to be understood that the invention may be applied to the brake shown in co-pending application Serial No. 465,490, filed November 13, 1942, by Alden et al., for "Brake mechanism," now United States Letters Patent No. 2,399,654, issued May 7, 1946, and be utilized to replace the hydraulic cylinder D, and employed to spread the upper ends of the levers 51 and 52 and the appended claims are intended to embrace the invention when it is incorporated in that type of brake. Similar brakes of that type are shown in the applications of Spiller et al., Serial No. 387,314 and Alden et al. Serial No. 419,198, for "Brake mechanism," now Patents Nos. 2,337,069 and 2,337,070, respectively.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake mechanism adapted for association with a drum; a support; a pair of brake shoes carried by said support and engageable with said drum; and a movable wedge between adjacent free ends of said brake shoes operative to apply said brake by separating said brake shoe ends, said wedge comprising a radially movable carrier mounted on said support, a pair of cam members slidably supported by said carrier for compensative movement relative to said carrier and cooperating with said brake shoe ends; and brake adjusting means operatively connected with said cam members and movable with said carrier.

2. In a brake mechanism adapted for association with a drum; a support; a pair of brake shoes carried by said support and engageable with said drum; and a movable wedge between adjacent free ends of said brake shoes operative to apply said brake by separating said brake shoe ends, said wedge comprising a radially movable carrier mounted on said support, a pair of cam members slidably supported by said carrier for movement relative to said carrier in a direction generally tangentially of said brake drum and cooperating with abutments on said brake shoe ends; and brake adjusting means operatively associated with and movable with said cam members operative to adjust the distance between said cam members and maintain said cam members a predetermined distance apart.

3. A brake mechanism as defined in claim 1, wherein said carrier comprises a generally hollow body having oppositely extending, slotted end portions slidably receiving said cam members.

4. A brake mechanism as defined in claim 1, wherein said carrier comprises a generally hollow body having oppositely extending, slotted end portions slidably receiving said cam members and said cam members have cam surface carrying portions extending laterally beyond the main cross sectional area of said carrier.

5. A brake mechanism as defined in claim 1, wherein said carrier comprises a generally hollow body having oppositely extending, slotted end portions slidably receiving said cam members, said cam members have cam surface carrying portions extending laterally beyond the main cross sectional area of said carrier and said carrier is provided with integral, laterally extending shelves along said slots supporting the laterally extending portions of said cam members.

6. A brake mechanism as defined in claim 1, wherein said brake adjusting means comprises an adjusting screw having threaded end portions of opposite thread pitch received in threaded apertures in said cam members, and means for manually rotating said screw.

7. A brake mechanism as defined in claim 1, wherein said brake adjusting means comprises an adjusting screw having threaded end portions of opposite thread pitch received in screw threaded apertures in said cam members, and an intermediate portion between said threaded end portions; a worm gear surrounding said intermediate portion of said screw and slidably engaged therewith; and a worm shaft rotatably mounted on said carrier and engaged with said worm gear.

8. A brake mechanism as defined in claim 1, wherein said brake adjusting means comprises an adjusting screw having threaded end portions of opposite thread pitch received in screw threaded apertures in said cam members, and an intermediate portion between said threaded end portions; a worm gear surrounding said intermediate portion of said screw and slidably engaged therewith; and a worm shaft rotatably mounted on said carrier and engaged with said worm gear, said carrier supporting abutments one at each side of said worm gear to restrain said worm gear against moving out of meshing relationship with said worm shaft.

9. A brake mechanism as defined in claim 1, wherein an operating lever fulcrumed on said support has a pivotal connection at one end with said carrier and a pivotal connection at its opposite end with a brake operating power unit.

10. A brake mechanism as defined in claim 1, wherein said abutments comprise anti-friction rollers mounted one at each side of each brake shoe at the free ends thereof.

11. A brake mechanism as defined in claim 1, wherein said abutments comprise anti-friction rollers mounted one at each side of each brake shoe at the free ends thereof, the two rollers on each brake shoe straddling said carrier and contacting cam surfaces on said cam members.

12. In a brake mechanism having a drum; a support; a pair of brake shoes carried by said support and engageable with said drum; and a movable wedge between adjacent free ends of said brake shoes operative to apply said brake by separating said brake shoe ends, said wedge comprising a radially movable carrier mounted on said support, a pair of cam members slidably supported by said carrier for movement relative to said carrier in a direction generally tangentially of said brake drum and cooperating with abutments on said brake shoe ends; and brake adjusting means operatively associated with and movable with said cam members; a lever fulcrumed on said support and pivotally connected adjacent one end with said carrier, and a power unit having a portion fixed relative to said support and a movable portion pivotally connected with the opposite end of said lever for applying said brake.

13. In a brake assembly, a brake drum having an open end, a cover closing said open end, a support within said drum, a pair of brake shoes pivoted at corresponding ends on said support within the drum and having their opposite ends provided with adjacent abutments, a wedge actuator mounted within said drum between said abutments, said wedge actuator comprising a pair of separable members each adapted to engage one of said abutments, means for moving said actuator radially of said drum, and means for adjusting said members toward or away from each other having an operating member extending generally axially of said drum and through an opening in said cover for accessibility externally of said drum.

MATHEW B. MORGAN.

REFERENCES CITED

The following references are of record in the file of this patent:

UNITED STATES PATENTS

| Number | Name | Date |
|---|---|---|
| 1,976,420 | Taylor | Oct. 9, 1934 |
| 1,980,512 | White | Nov. 13, 1934 |
| 2,163,896 | Sugarman | June 27, 1939 |
| 1,718,058 | Mickulecky | June 18, 1929 |
| 1,457,681 | Whittingham | June 5, 1923 |
| 2,149,614 | Main | Mar. 7, 1939 |